United States Patent [19]
Strain

[11] 3,809,139
[45] May 7, 1974

[54] CLINCH-SLIDE NUT, PANEL ASSEMBLY AND METHOD OF FORMING SAME

[75] Inventor: William E. Strain, Birmingham, Mich.

[73] Assignee: Kean Manufacturing Corporation, Dearborn Heights, Mich.

[22] Filed: May 26, 1972

[21] Appl. No.: 257,109

[52] U.S. Cl. .............................. 151/41.72, 29/437
[51] Int. Cl. .................................... F16b 37/04
[58] Field of Search ............ 151/41.72, 69; 85/32 K; 285/202; 29/513, 437

[56] References Cited
UNITED STATES PATENTS
| | | | |
|---|---|---|---|
| 2,075,675 | 3/1937 | Thorrez | 151/41.72 |
| 1,332,686 | 2/1920 | Reynolds | 285/202 |
| 1,872,385 | 8/1932 | Andren | 151/41.72 |
| 1,342,225 | 6/1920 | Perlman | 85/32 K |

FOREIGN PATENTS OR APPLICATIONS
| | | | |
|---|---|---|---|
| 503,900 | 4/1939 | Great Britain | 85/32 K |
| 964,070 | 7/1964 | Great Britain | 151/41.72 |

*Primary Examiner*—Edward C. Allen

[57] ABSTRACT

A nut and panel assembly, wherein the nut is loosely retained in an elongated panel opening for sliding adjustment therein. The nut includes a central pilot which is disposed through the panel opening, a pair of opposed flanges which overlie one face of the panel and a pair of ears which extend upwardly from the top face of the pilot, prior to securement, and are deformed outwardly and downwardly to overlie the opposed flanges and the panel to loosely retain the nut in the panel opening. A pair of grooves are provided in the side walls of the pilot, beneath the ears, to accommodate the flow of metal during deformation of the ears and limit lateral displacement of the side walls which would lock the nut in the panel opening.

7 Claims, 5 Drawing Figures

3,809,139

CLINCH-SLIDE NUT, PANEL ASSEMBLY AND METHOD OF FORMING SAME

FIELD OF THE INVENTION

The nut and panel assembly of this invention relates generally to a slide nut which is deformed or clinched to slidably retain the nut in an elongated panel opening and the method of retaining the nut for sliding adjustment.

The prior art includes a number of slide nuts or cage nuts, however the conventional cage nut is formed of at least two elements, including a sheet metal cage which retains the nut in the elongated panel opening or slot. One example of a cage nut is U.S. Pat. No. 2,940,496. Clinch and pierce nuts are also disclosed in the prior art, however clinch nuts are normally securely retained in the panel opening against any lateral movement. The improved clinch-slide nut of this invention may be rolled from wire stock and includes only one element. The nut is merely disposed in the panel opening and clinched in place.

The preferred embodiment of the nut includes a central pilot portion and a laterally extending flange on opposite sides of the pilot portion. A bore extends through the pilot portion, generally perpendicular to the top face, for receipt of a male threaded fastener. An ear portion extends upwardly from the top face of the pilot portion which is deformed during securement to overlay the flange portion, on opposite sides of the pilot, and a groove is provided in the side wall of the pilot portion, adjacent the ear portion to accomodate deformation of the ear portion.

In the disclosed embodiment of the nut, the pilot portion is generally rectangular and includes a pair of opposed side flanges extending laterally from the pilot portion and spaced from the top face by side walls. The ear portion includes a pair of ears extending upwardly from the side edges of the top face of the pilot portion and a groove is defined in the side wall, beneath each of the ears, to limit lateral deformation of the side walls which would lock the nut in the panel opening. The upper edge of the ears may be rounded and the side walls tapered outwardly, from the grooves, such that the ears are deformed outwardly and downwardly upon impact by the surface of a tool. In the disclosed embodiment, the ears are flattened to be coplanar with the top surface of the pilot portion during securement.

In the panel assembly, the pilot portion of the nut is disposed in the elongated panel opening for sliding adjustment and the flanges overlay the opposed edges of the panel. The ears are deformed outwardly and downwardly to overlie the opposed face of the panel and the opposed flanges to loosely retain the nut in the panel opening. The grooves in the side of the pilot portion, or body portion of the nut, receive the metal flow of the ears and limit lateral displacement of the side walls, as described above.

The method of securing the nut in the panel includes disposing the pilot portion of the nut through the elongated panel opening, with the flanges overlying the panel edge, and deforming the ear portions outwardly and downwardly to retain the nut in the panel opening and into the grooves to permit sliding adjustment of the nut in the elongated panel opening. The outer distal edges of the ears are preferably substantially aligned with the side walls of the pilot portion, prior to securement, for receipt of the nut in the panel opening.

Other advantages and meritorious features of the disclosed invention will more fully appear from the following description of the preferred embodiments, the drawings and the appended claims.

DESCRIPTION OF THE PREFERRED EMBODIMENTS

Figure 3:
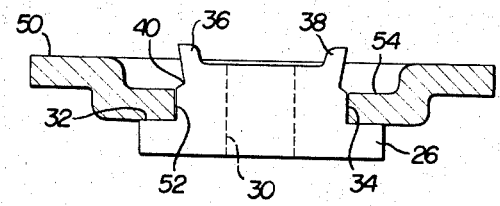
FIG. 3 is a side cross sectional view of FIG. 2, in the direction of view arrows 3—3.

The disclosed embodiment of the slide nut 20 includes a generally rectangular body portion 22 a pilot portion 24 and a pair of opposed flanges 26. The pilot portion includes a flat top face 28 and a threaded bore or aperture 30 which extends through the body portion 22. The top faces 32 of the flanges are also preferably flat to overlie one face of the panel, as shown in FIG. 3, and the flanges are spaced from the top face of the pilot portion by side walls 34.

Figure 1:
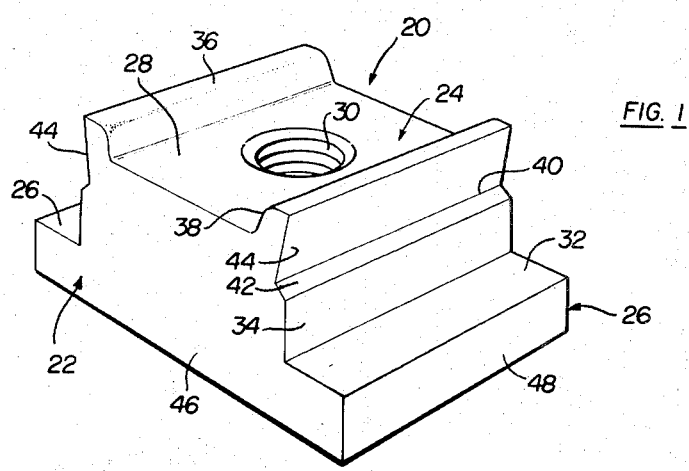
FIG. 1 is a top perspective view of one embodiment of the slide-clinch nut of this invention.

In the preferred embodiment, the pilot portion also includes a pair of ears 36 which extend upwardly from the sides of the pilot portion face 28. The inner distal edges 38 of the ears are preferably rounded or arcuate, as shown in FIG. 1, and the outer side face 44 of the ears are tapered outwardly from the groove 40. The purpose of the preferred configuration of the ears will be described hereinbelow. The groove 40 is then defined by an inwardly inclined wall 42 and the outwardly inclined face 44 of the ears.

Figure 2:
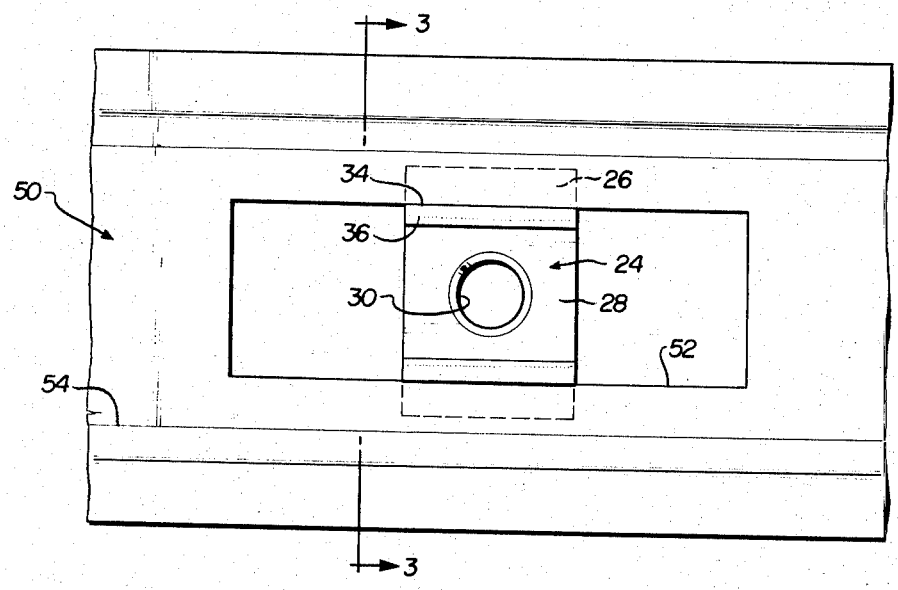
FIG. 2 is a top view of one embodiment of the nut and panel, prior to securement of the nut.

The end wall 46 of the body portion may be substantially flat and perpendicular to the top face 28 of the pilot portion and 48 of the flanges, as shown in FIGS. 1 and 2, however the shape of these walls is not particularly critical.

The material of the nut will depend upon the particular application of the nut and panel assembly. For example, C–1211 and C–1108 steel have been found satisfactory for the nut, however other materials may also be utilized. The panel may be a conventional sheet metal panel, such as steel, which is utilized in the automotive industry.

Figure 4:
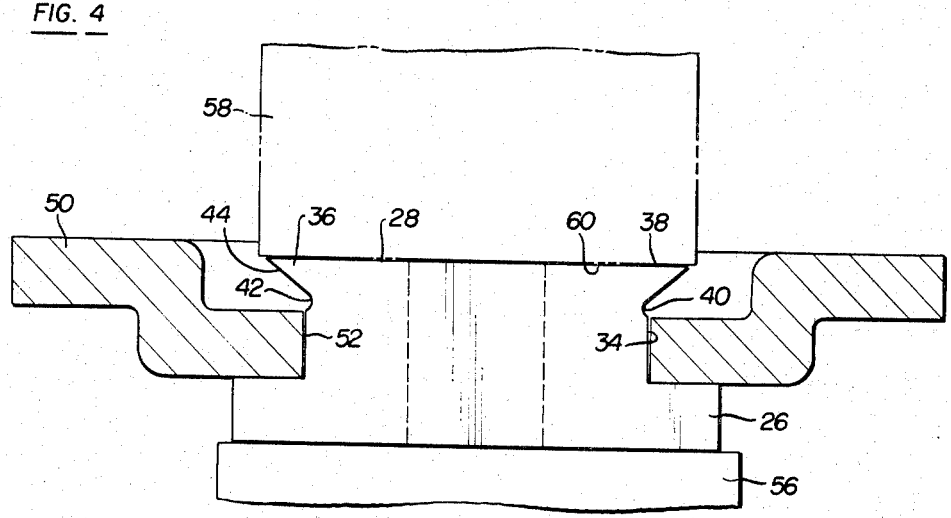
FIG. 4 is a side cross sectional view of the panel assembly, during securement of the nut.

As described hereinabove, the disclosed nut is particularly suitable for slidable securement in an elongated opening or slot, such as provided in the panel 50 in FIGS. 2 and 3. The opening 52 may be rectangular, as shown in FIG. 2, or the opening may be arcuate, for example, with parallel side edges. In the disclosed embodiment, the panel has been embossed, as shown at 54, to provide a channel and to make the pilot face substantially flush with the panel, as shown in FIGS. 4 and 5.

The slide nut is secured within the panel by disposing the pilot portion 24 through the elongated panel opening, with the side walls 34 slightly spaced from the opposed side edges of the opening, as shown in FIGS. 2 and 3. In this position, the upwardly extending ears 36 extend through the panel opening for securement of the nut in the panel, as shown in FIG. 4.

Figure 5:
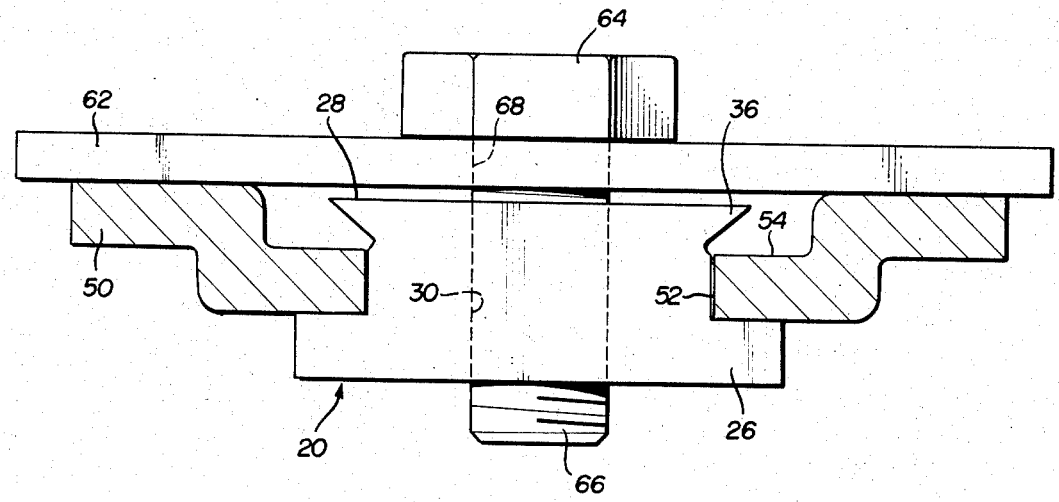
FIG. 5 is a side cross sectional view of the panel assembly, including a second member secured to the assembly by a threaded male fastener.

The nut is supported in the panel opening by a suitable support, such as a lower die member 56, and the ears are deformed by impacting the upper surface of the nut with a tool 58 having an impacting surface 60. The tool 58 first engages the arcuate surface 38 of the inner distal end of the ear portion, as shown in FIG. 3 and deforms the ears outwardly and downwardly about an axis parallel to the groove 40. The outer side walls 44 of the ears are deformed to overlie the flanges 26, as shown in FIG. 4, and the groove 40 accommodates the metal flow during deformation of the ears and prevents lateral displacement of the side wall 34 of the pilot portion. It will be noted that the side wall 34 is closely spaced from the inner wall 52 of the opening and any lateral deformation would lock the nut in the panel opening. The nut and panel assembly, as shown in FIGS. 4 and 5, includes a reduced groove opening 40 which results from impacting the ears downwardly to lie substantially flat and coplanar with the pilot face 28. The upper surface of the ears, after impacting, may also lie below the plane of the pilot face, as where the ears are rounded, however the ears preferably do not extend above the pilot face.

one embodiment of the final panel assembly is shown in FIG. 5, wherein a structural member 62 has been secured to the panel 50 by a suitable male threaded fastener 64. The pilot face 28 is recessed within the embossed channel 54 of the panel 50 and the threaded bore 30 threadably receives the male threaded end 66 of the fastener 64. The slide nut 20 may be adjusted in the elongated panel opening 52 to receive the male threaded fastener and assure proper alignment of the structural member 62. The panel assembly and slide nut 20 is particularly useful in structural assemblies where a number of apertures 68 are provided in the structural member which must be aligned with the threaded opening 30 of the slide nut. Each of the slide nuts may be adjusted independently for alignment with the apertures 68 in the structural member 62. It will be understood that the shape and configuration of the elongated slot 52 and the panel 50 will depend upon the particular application and may even be arcuate provided the side walls are substantially parallel. Further, the shape of the slide nut 20 may be modified to suit a particular application.

In the preferred embodiment of the nut and panel assembly, the individual nuts are cut or chopped from a rolled metal section having the cross sectional configuration shown in FIG. 3. The flanges 26, ears 36 and grooves 40 may be rolled from generally round wire stock. In this preferred embodiment, the nut is symetrical about the threaded bore axis 30 and includes two opposed, continuous ears 36 and grooves 40. The preferred nut configuration will therefore be generally rectangular and the side edges of the panel opening 52 which receives the nut are generally parallel.

I claim:

1. A nut for receipt in an elongated panel opening, to be slidably secured within the panel opening, comprising:

a body portion having a generally flat top face, a bore through said top face and said body portion, a flange portion extending laterally from said body portion, spaced from said top face by side walls, a pair of ears extending upwardly from the side edges of said top face having distal edges substantially aligned with said side walls adapted to be deformed outwardly and downwardly to overly said flanges and secure the nut within the panel opening, and a pair of grooves defined in said side walls, beneath said ears and the side faces of said ears taper outwardly from said grooves, said grooves accommodating the flow of metal as the ears are deformed outwardly, thereby limiting outward deformation of said side walls which would tend to lock said nut within the panel opening.

2. The nut defined in claim 1, characterized in that the upper edges of said ears are arcuate to lie substantially flat, when deformed outwardly, substantially coplanar with said top face.

3. A nut for receipt in an elongated panel opening, to be slidably secured in the panel opening, comprising:

a body portion having a top face, a bore through said top face and said body portion, a flange portion extending laterally from said body portion on opposed sides and spaced from said top face by opposed side walls, a pair of ears extending upwardly from the side edges of said top face adapted to be received within the panel opening and deformed outwardly and downwardly to overly said flange portion and slidably secure said nut within the panel opening, and a groove defined in said side walls, beneath said ears, accommodating the flow of metal as the ears are deformed outwardly, said groove having an inwardly tapered wall adjacent said ears and the outer side wall of said ears tapered outwardly from said inwardly tapered wall defining a V-shaped groove limiting outward deformation of the side walls which would tend to lock said nut within the panel opening.

4. A nut for receipt in an elongated panel opening to be slidably secured within the panel opening, comprising:

a body portion having a top face, a bore through said top face and said body portion, a flange portion extending laterally from said body portion on opposed sides of said body portion and spaced from said top face, an ear portion extending upwardly from the side edges of said top face adjacent said flange portion adapted to be deformed outwardly and downwardly to overly said flanges and secure the nut within the panel opening, and a groove defined in said body portion beneath said ear portion, said groove accommodating the flow of metal as the ears are deformed outwardly, thereby limiting outward deformation of said side walls which would tend to lock the nut within the panel opening, said ear portion having an outer side wall tapered inwardly to said groove, an inner side wall generally parallel to said outer side wall, a generally flat top face and an arcuate surface joining said top face and said inner side wall, whereby the inner side wall may be deformed flat and generally coplanar with said top face.

5. A nut and panel assembly, comprising in combination:

a panel having an elongated aperture, a nut having a laterally extending flange on opposed sides of said nut overlying a face of said panel, adjacent said aperture, a central pilot disposed through said panel aperture having a substantially top face and opposed side walls generally perpendicular to said top face, a bore extending through said nut, substantially perpendicular to said top face to receive a male fastener, and an ear portion overlying the opposed face of said panel portion and said flange portion on said opposed sides of said nut and loosely retaining said nut in said panel aperture, said ear portion having a top face generally coplanar with said top face of said pilot portion and an outwardly tapered face opposite and spaced from said flange a distance greater than the panel thickness to permit sliding movement of said nut within said elongated panel aperture, and a groove in said opposed side walls of said nut having an inwardly inclined wall adjacent said ear portion and joining said tapered ear face to define a V-shaped groove beneath said ear portion and spacing said ear portion from said side wall.

6. The nut and panel assembly defined in claim 5, characterized in that the side edges of said panel opening are generally parallel and said panel is embossed, adjacent said opening, to provide a channel for sliding adjustment of said nut within the panel opening and said pilot portion is recessed.

7. The method of securing a nut in an elongated panel opening for sliding movement of the nut within the panel opening, said nut having a central pilot portion, a laterally extending flange on opposed sides of said pilot portion, ear portions extending upwardly from said top face on opposed sides of said pilot portion having a top face, inclined, generally parallel outer and inner side walls and an arcuate impact surface joining said top face and said inner wall, and a V-shaped groove in said side walls of said pilot portion adjacent said ear portions, including the steps of:
 a. inserting said pilot portion of the nut through said elongated panel opening with said flanges overlying the panel edges defining said opening,
 b. supporting the flanged end of said nut within said panel opening,
 c. impacting the ear portion of said nut with a generally flat tool, forming a co-planar flat end face and deforming said ear portion outwardly of the pilot portion and toward the flange to overhang the panel edges and retain said nut in said elongated panel opening, and
 d. limiting the lateral deformation of the nut body and loosely retaining the nut within the panel opening by displacing the metal of deformation of said ear portion into said groove and prevent locking of the nut in the panel opening during deformation of the ear portion.

* * * * *